United States Patent Office 3,102,040
Patented Aug. 27, 1963

3,102,040
PARAFFIN WAX COMPOSITIONS
Malcolm S. Williams, El Cerrito, and Richard C. Fox, San Rafael, Calif., assignors to California Research Corporation, San Francisco, Calif., a corporation of Delaware
No Drawing. Filed Mar. 31, 1960, Ser. No. 18,803
7 Claims. (Cl. 106—270)

This invention pertains to improved wax compositions having high gloss characteristics.

This patent application is a continuation-in-part of patent application Serial No. 721,627, filed March 17, 1958, now abandoned.

Paraffin waxes have been used for many years for coating numerous surfaces. Because of its effectiveness in resisting water and water vapor transmission, paraffin wax has been used as a coating material for paper packages and wrappers, particularly as coatings for milk cartons. Characteristics which are desirable in paraffin wax for such use include the high gloss, resistance to scuffing and flaking, low tackiness, and resistance to transmission of water and water vapor.

Although uncompounded paraffin waxes are used extensively, numerous additives have been included in wax compositions in attempts to obviate the inherent faults of waxes per se. For example, polyethylenes, polymethylenes, and polyisobutylenes have been added to paraffin wax to improve various properties thereof. Although polyisobutylenes increase the tensile strength of the wax, the viscosity of the resulting wax composition is increased excessively, and the resulting polyisobutylene-wax composition "blocks" (that is, adjacent waxed surfaces under pressure stick together) at a lower temperature than the wax per se. Polyethylenes, on the other hand, may improve some properties of wax compositions, but the resulting polyethylene-paraffin wax compositions have higher water vapor transmission rates (i.e., permit greater transmission of water through the wax coating).

A wax known as "Fischer-Tropsch wax" has long been available for the preparation of wax compositions. It has been asserted that a Fischer-Tropsch wax can be used (1) as a wax, or (2) as an additive for paraffin wax compositions.

Fischer-Tropsch waxes can be used in coatings for paper when the wax-coated paper is water cooled subsequent to the coating step. That is, a paper sheet can be dipped in a melted Fischer-Tropsch wax, then shock cooled by immediately passing the hot coated waxed paper into a tank or trough of water. A Fischer-Tropsch wax can be used in various amounts as an additive in paraffin wax compositions wherein the wax compositions are used to coat paper sheetings which are immediately water-cooled subsequent to the coating step.

However, there are certain disadvantages found in the use of large amounts of Fischer-Tropsch waxes as additives for certain particular paraffin wax compositions used for coating paper sheetings and milk cartons wherein the wax coatings are cooled in air or with a chilled calender roll. For example, when a paper was coated with a wax composition consisting of 1% of a Fischer-Tropsch wax and 99%, by weight, of a petroleum paraffin wax having a melting point range of 125° F. to 130° F. and then air cooled, the resulting waxed paper had a considerably lower gloss rating than a paper which had been coated with only paraffin wax.

Therefore, it is a primary object of this invention to correct the deficiencies of calender cooled wax compositions set forth hereinabove for use in air or calender cooled wax films.

In accordance with the present invention, it has been discovered that calender cooled paraffin wax compositions having high gloss charatceristics are obtained by incorporating from 0.03% to 0.3%, by weight, of a Fischer-Tropsch wax in certain particular pertroleum paraffin waxes. That is, the compositions of this invention comprise certain particular petroleum paraffin wax and from 0.03% to 0.3%, by weight, of a Fischer-Tropsch wax.

In addition to having extremely high gloss characteristics, the paraffin wax compositions of this invention have high tensile strength, low water vapor transmission rates, good antiscuffing characteristics and low tackiness.

Furthermore, small concentrations of Fischer-Tropsch waxes in the particular wax compositions set forth herein result in the formation of wax compositions having high gloss characteristics (that is, calender cooled and air cooled waxed papers having high gloss characteristics) without the presence of undesirable striations of air cooled wax films.

The particular paraffin waxes (e.g., petroleum paraffin waxes) which are improved by the addition thereto of the Fischer-Tropsch waxes include paraffin waxes (and blends thereof) having average melting points in the range of 125° F. to 155° F. AMP. (The term "AMP" refers to American Melting Point, as defined in ASTM D–87–42.) Of the wax compositions available in the melting point range of 125° F. to 155° F., the preferred waxes are the petroleum refined paraffin waxes having melting points in the range of 139° F. to 142° F. AMP. Waxes having such melting points are obtained by blending petroleum refined paraffin waxes having melting points in the range of 125° F. to 130° F. AMP with petroleum refined paraffin waxes having melting points in the range of 142° F. to 153° F. AMP.

The phrase Fischer-Tropsch waxes means the waxes synthesized by the familiar Fischer-Tropsch process. By this process, coal is burned in the presence of oxygen and steam to produce hydrogen and carbon monoxide, which are then reacted in the presence of a catalyst to make the desired hydrocarbon wax.

The particular Fischer-Tropsch waxes used herein were obtained under the trade name of "Paraflint." This Fischer-Tropsch wax is a high molecular weight wax having an average molecular weight in the range of about 750 to 1000; and it consists essentially of straight-chain hydrocarbons.

The Fischer-Tropsch waxes are used herein in amounts from 0.03% to 0.3%, by weight, of the finished composition; more preferably, from 0.03% to 0.1%, by weight.

As set forth in the data of Table I, hereinbelow, the addition of only 0.05%, by weight, of Fischer-Tropsch wax to a petroleum paraffin wax having a melting point of 139° F. to 142° F. AMP improved the calender cooled gloss characteristics considerably over that of the paraffin wax per se. However, the addition of 1% of the same Fischer-Tropsch wax to the same paraffin wax reduced the gloss characteristic to a considerable degree below that of the paraffin wax per se. That is to say, that the addition of an amount of 1% of the Fischer-Tropsch wax to the paraffin wax was detrimental to the final wax composition as to gloss characteristics.

Table I hereinbelow presents data on the effectiveness of the Fischer-Tropsch waxes as improving agents for the particular wax compositions described herein.

The wax "A" was a petroleum refined paraffin wax having a melting point range from 125° F. to 130° F. AMP. The wax "B" was a petroleum refined paraffin wax having a melting point range from 139° F. to 142° F. AMP.

Gloss measurements were made with a 60° Gardner gloss meter using a standard setting of 100 for the reflectivity rating obtained for a polished, standard black plate. The water vapor transmission rate (WVTR) was measured by TAPPI Method T-448-M-49.

Table I

| Paraffin Wax | Amount of Fischer-Tropsch Wax Percent By Wt. | WVTR (Grams/m.²/day) | Gloss | Wax Film Striations |
|---|---|---|---|---|
| A | 0 | | ¹ 40 | Excessive. |
| A | 0.05 | | ¹ 48 | None. |
| A | 1.0 | | ¹ 17 | None. |
| B | 0 | 0.14 | ² 78 | |
| B | 0.05 | 0.05 | ² 90–100 | |
| B | 0.2 | | ² 86 | |
| B | 1.0 | | ² 73 | |

¹ Air cooled waxed milk cartons.
² Calender cooled waxed glassine paper.

The data presented in Table II hereinbelow further illustrates the effectiveness of small amounts of Fischer-Tropsch waxes in improving the gloss characteristics of waxes described herein.

Wax C was a blend consisting of 80%, by weight, of a California wax having a melting point of 142.5° F. AMP and 20% of a wax melting in the range of 128–130° F. AMP.

Wax D was a blend consisting of 80%, by weight, of a California wax having a melting point of 142.5° F. AMP and 20% of a wax having a melting point of 127.7° F. AMP.

Table II

| Paraffin Wax | Melting Point, °F., AMP | Amount of Fischer-Tropsch Wax, Percent By Wt. | Gloss ¹ |
|---|---|---|---|
| C | 139.7 | 0.0 | 83 |
| C | 139.7 | 0.05 | 90 |
| D | 139.3 | 0.0 | 83 |
| D | 139.3 | 0.05 | 94 |

¹ Calender cooled waxed glassine paper.

When papers (e.g., milk cartons) have been coated with the wax compositions of this invention, the wax coatings are cooled slowly (as opposed to "shock cooling").

In the process of calender cooling papers coated with wax compositions, the paper to be waxed is passed through the molten wax compositions described herein (such as wax compositions consisting of 99.95% of a paraffin wax characterized by a melting point of 139° F. to 142° F. AMP and 0.05% of a Fischer-Tropsch wax), then onto a calender roll cooled with a cooling medium. The calender roll is usually not immediately adjacent to the molten wax bath, so the paper with the molten wax thereon normally passes a distance in the air before reaching the calender roll.

With milk cartons, the milk carton is dipped in the molten wax, then withdrawn therefrom and suspended in the air at temperatures of 35° F. to 60° F. for a time sufficient to cool the wax composition.

We claim:

1. A paraffin wax composition consisting essentially of from 0.03% to 0.1% by weight of a Fischer-Tropsch wax having an average molecular weight in the range of about 750 to 1000, and the balance of said paraffin wax composition consisting essentially of a petroleum refined paraffin wax having an average melting point in the range of 125° to 155° F. AMP.

2. A paraffin wax composition consisting essentially of from 0.03% to 0.1% by weight of a Fischer-Tropsch wax having an average molecular weight in the range of about 750 to 1000, and the balance of said wax composition consisting essentially of a petroleum refined paraffin wax selected from the group consisting of a paraffin wax having an average melting point in the range of 125° to 130° F. AMP and a paraffin wax having an average melting point in the range of 139° to 142° F. AMP.

3. A paraffin wax composition consisting essentially of from 0.03% to 0.1% by weight of a Fischer-Tropsch wax having an average molecular weight in the range of about 750 to 1000, and the balance of said wax composition consisting essentially of a petroleum refined paraffin wax having an average melting point in the range of 125° to 130° F. AMP.

4. A paraffin wax composition consisting essentially of from 0.03% to 0.1% by weight of a Fischer-Tropsch wax having an average molecular weight in the range of about 750 to 1000, and the balance of said wax composition consisting essentially of a petroleum refined paraffin wax having an average melting point in the range of 139° to 142° F. AMP.

5. A paraffin wax composition consisting essentially of 0.05% by weight of a Fischer-Tropsch wax having an average molecular weight in the range of about 750 to 1000, and the balance of said wax composition consisting essentially of a petroleum refined paraffin wax having an average melting point in the range of 139° to 142° F. AMP.

6. A process of applying paraffin wax coatings onto paper comprising passing a paper strip through a molten wax composition then onto a cooled calender roll, wherein said wax composition consists essentially of from 0.03% to 0.1% by weight of a Fischer-Tropsch wax having an average molecular weight in the range of about 750 to 1000, and the balance of said wax composition consisting essentially of a petroleum refined paraffin wax having an average melting point in the range of 125° to 130° F. AMP.

7. A process of applying paraffin wax coatings onto paper comprising passing a paper strip through a molten wax composition then onto a cooled calender roll, wherein said wax composition consists essentially of from 0.03% to 0.1% by weight of a Fischer-Tropsch wax having an average molecular weight in the range of 750 to 1000, and the balance of said wax composition consisting essentially of a petroleum refined paraffin wax having an average melting point in the range of 139° to 142° F. AMP.

References Cited in the file of this patent

UNITED STATES PATENTS

| 2,956,036 | King | Apr. 13, 1954 |
| 2,967,781 | Jakaitis | Jan. 10, 1961 |

OTHER REFERENCES

Warth Chemistry and Technology of Waxes, 2nd ed., Reinhold Pub. Corp., N.Y., 1956, pages 791–792.